US012724313B2

(12) United States Patent
Yang et al.

(10) Patent No.: US 12,724,313 B2
(45) Date of Patent: Sep. 1, 2026

(54) ARBITRARILY TAILORABLE ELECTROCHROMIC DEVICE AND USE THEREOF

(71) Applicant: Tsinghua Shenzhen International Graduate School, Shenzhen (CN)

(72) Inventors: Cheng Yang, Shenzhen (CN); Xi Ren, Shenzhen (CN)

(73) Assignee: TSINGHUA SHENZHEN INTERNATIONAL GRADUATE SCHOOL, Shenzhen (CN)

( * ) Notice: Subject to any disclaimer, the term of this patent is extended or adjusted under 35 U.S.C. 154(b) by 735 days.

(21) Appl. No.: 18/306,054

(22) Filed: Apr. 24, 2023

(65) Prior Publication Data

US 2023/0258994 A1 Aug. 17, 2023

Related U.S. Application Data

(63) Continuation of application No. PCT/CN2021/129541, filed on Nov. 9, 2021.

(30) Foreign Application Priority Data

Dec. 24, 2020 (CN) ......................... 202011556671.8

(51) Int. Cl.
*G02F 1/1523* (2019.01)
*G02F 1/15* (2019.01)

(52) U.S. Cl.
CPC ...... *G02F 1/1525* (2013.01); *G02F 2001/164* (2019.01)

(58) Field of Classification Search
CPC .. G02F 1/153; G02F 1/1525; G02F 2001/164; G02F 2202/36; G02F 1/0147; G02F 1/1523; G02F 1/1506; G02F 1/155; G02F 1/157; G02F 2001/1552
See application file for complete search history.

(56) References Cited

U.S. PATENT DOCUMENTS

2008/0070086 A1 3/2008 Fukuchi et al.
2017/0010514 A1* 1/2017 Yashiro ................ G02F 1/1533

FOREIGN PATENT DOCUMENTS

CN 1210870 A 3/1999
CN 101434708 A 5/2009
CN 105938919 A 9/2016
(Continued)

OTHER PUBLICATIONS

International Search Report (with English translation) and Written Opinion issued in PCT/CN2021/129541, dated Feb. 9, 2022, 9 pages provided.

*Primary Examiner* — Brandi N Thomas
(74) *Attorney, Agent, or Firm* — HSML P.C.

(57) ABSTRACT

Disclosed is an arbitrarily tailorable electrochromic device and use thereof, wherein the electrochromic device includes in order of a first transparent flexible substrate, a first transparent electron-conductive layer, an electrochromic layer, an electrolyte solution with automatically curable in presence of air and/or moisture to achieve a self-encapsulation function, an ion storage layer, a second transparent electron-conductive layer and a second transparent flexible substrate. The electrochromic device of the present disclosure is arbitrarily tailorable and can be used in various applications.

17 Claims, 2 Drawing Sheets

(56) References Cited

FOREIGN PATENT DOCUMENTS

| | | | | |
|---|---|---|---|---|
| CN | 106371258 A | | 2/2017 | |
| CN | 106932992 A | | 7/2017 | |
| CN | 106997134 A | | 8/2017 | |
| CN | 108519709 A | | 9/2018 | |
| CN | 108549182 A | | 9/2018 | |
| CN | 108659772 A | | 10/2018 | |
| CN | 109401693 A | | 3/2019 | |
| CN | 109755636 A | | 5/2019 | |
| CN | 111224167 A | | 6/2020 | |
| CN | 112540488 A | | 3/2021 | |
| JP | 2009076479 A | | 4/2009 | |
| WO | WO 2012138281 | * | 10/2012 | ............... G02F 1/17 |
| WO | 2020022381 A1 | | 1/2020 | |
| WO | WO 2020056326 | * | 3/2020 | ............. G02F 1/157 |

* cited by examiner

ARBITRARILY TAILORABLE ELECTROCHROMIC DEVICE AND USE THEREOF

CROSS REFERENCE TO RELATED APPLICATIONS

The present application is a Continuation Application of PCT Application No. PCT/CN2021/129541 filed on Nov. 9, 2021, which claims the priority of Chinese Patent Application No. 202011556671.8 filed on Dec. 24, 2020. The contents of all of the above are hereby incorporated by reference.

TECHNICAL FIELD

The present disclosure relates to the field of electrochromic materials and devices, and more particularly to an arbitrarily tailorable electrochromic device and use thereof.

BACKGROUND ART

Electrochromism is a special phenomenon of reversible change between a coloring state with low optical transmittance and a bleached state with high optical transmittance. With the insertion or extraction of ions or electrons in organic and/or inorganic electrochromic materials under the action of alternating high-low or positive-negative external electric fields, reversible change of color and transparency in appearance performance will occur. Electrochromic materials with the advantages of a controllable structure, rich color, low cost, energy saving and low consumption, are mainly used in buildings, automobiles, electronic instruments, and other products to regulate and save energy. The prepared electrochromic devices have the characteristics of high efficiency, low consumption, environmental protection, pollution-free and intelligence, which can meet the requirements of sustainable development strategy.

Nowadays, most of the traditional electrochromic devices are still limited to rigid devices with the ultra-high production cost. With the rapidly increases in people's demand, traditional rigid devices can no longer satisfy people's need, which means the flexible devices are in widely used and in huge demand. Under such circumstance, the market of flexible and wearable electrochromic devices is becoming larger and larger.

Moreover, electrochromic devices are mainly used outside, as the windows, the harsh natural condition will increase the risk of electrolyte leakage. Once the leakage occurs, the device will fail. So, during the preparation, the device needs an especially complex packaging process to seal the structure and meanwhile make it cannot be tailorable to any shape as people wish due to the cut will destroy the sealed structure. As the results, the price of production and shape customization of electrochromic devices is considerable expensive. As the multifarious application scenarios, the cost of customization cannot be negligible, which limits their commercial development.

SUMMARY OF THE INVENTION

The present disclosure provides an arbitrarily tailorable electrochromic device and use thereof.

In the first aspect, an arbitrarily tailorable electrochromic device is provided, comprising in order of a first transparent flexible substrate, a first transparent electron-conductive layer, an electrochromic layer, an electrolyte solution with automatically curable in presence of air and/or moisture to achieve a self-encapsulation function, an ion storage layer, a second transparent electron-conductive layer and a second transparent flexible substrate.

In the second aspect, use of the arbitrarily tailorable electrochromic device in a display screen of an electronic terminal device, a smart window in an environmental-friendly architectural, an automotive color-changing glass or an automatic anti-glare rear-view mirror is provided.

Advantages of the present disclosure include the following contents.

In the present disclosure, with the addition of the electrolyte addictive which can be curably contacted with air (containing oxygen) and/or moisture (containing water), the electrolyte at the cut part will be cured during the cutting process in air and/or moisture. As the formed cured layer can seal the structure to prevent air and/or moisture permeation and electrolyte leakage. In this way, the prepared devices can achieve self-encapsulation after cutting to achieve arbitrarily tailorable function. In specific, after tailoring, a formed layer between the electrolyte and air is dense enough to prevent the internal electrolyte from the outer environment and keep the electrolyte still in a liquid state with normal operation. Therefore, the ionic conductivity of the internal electrolyte is close to the commercial electrolyte and higher than the solid polymer electrolyte and the solid inorganic electrolyte. Therefore, the electrochromic device of the present disclosure has a faster response time compared with the electrochromic device prepared with a solid electrolyte, and better reliability compared with the electrochromic device prepared with a traditional liquid electrolyte to greatly reduce the risk of electrolyte leakage. Furthermore, according to the present disclosure, it is possible to achieve mass-production of the devices with uniform dimensions, and arbitrarily tailorable function. In this case, it can solve the problem of the high cost of shape customization of electrochromic devices due to the complex packaging required by conventional electrochromic devices.

DETAILED DESCRIPTION OF THE INVENTION

Figure 1:
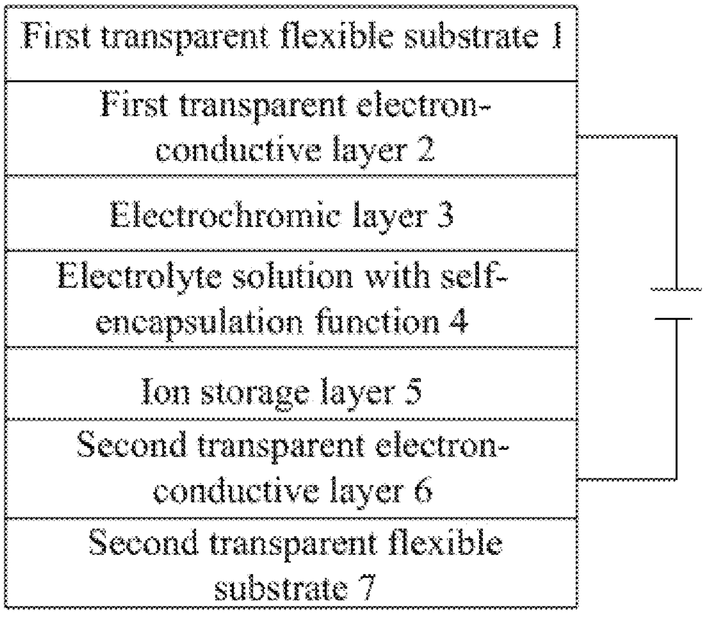
FIG. 1 is a schematic view showing a structure of an arbitrarily tailorable electrochromic device according to Embodiment 1 of the present disclosure.

The disclosure will now be further described in connection with preferred embodiments with reference to the accompanying drawings. It is noted that the embodiments and features of the embodiments in the present application can be combined with each other without conflict.

In one embodiment, an arbitrarily tailorable electrochromic device includes in order of a first transparent flexible substrate, a first transparent electron-conductive layer, an electrochromic layer, an electrolyte solution with automatically curable in presence of air and/or moisture to achieve a self-encapsulation function, an ion storage layer, a second transparent electron-conductive layer and a second transparent flexible substrate.

Further, the electrolyte solution comprises a component which is curable in presence of air and/or moisture, a solvent and an electrolyte; a content of the component which is curable in presence of air and/or moisture in the electrolyte solution is 20%-70% by mass, and a total content of the electrolyte and the solvent in the electrolyte solution is 30%-80% by mass; and a concentration of the electrolyte in a mixture of both the electrolyte and the solvent is 0.1 mol/L-10.0 mol/L.

A component which is curable in presence of air and/or moisture is added into the electrolyte solution, and during the cutting process, when the exposed electrolyte solution at the cut part encounters air and/or moisture, curing occurs, forming a closed structure to block air and/or moisture, preventing the loss and decomposition of the electrolyte solution, and realizing self-encapsulation after cutting, thereby achieving the effect of arbitrarily cutting. Cutting methods include, but are not limited to, cutting with scissors, cutting with a cutter, laser cutting, cutting with special film cutter, etc.

Further, the electrolyte solution further comprises ionically non-conductive inorganic nanoparticles or nanofibres, a content of the ionically non-conductive inorganic nanoparticles or nanofibres being greater than 0% and less than or equal to 10% by mass relative to a total mass of the component which is curable in presence of air and/or moisture, the solvent and the electrolyte.

The added ion-nonconductive inorganic nanoparticles or nanofibers have an effect of preventing short circuits, and in practical applications, other functional additives may be added as needed.

Further, the concentration of the electrolyte is 0.5 mol/L-5.0 mol/L, preferably 1.0 mol/L-2.5 mol/L.

Further, the content of the ionically non-conductive inorganic nanoparticles or nanofibers is from 0.5%-5% by mass.

Further, the component which is curable in presence of air is an alkyd resin, wherein the alkyd resin is a condensation product of a polyol, an anhydride and/or an acrylic acid, a polyunsaturated fatty acid, having a structure according to formula (I):

Formula (I)

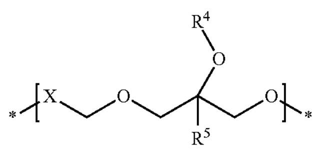

wherein the X group is derived from a diacid or diacid anhydride, preferably phthalic anhydride, maleic anhydride, and terephthalic acid; $R^4$ is H or derived from a polyunsaturated fatty acid of 6~30 carbons, preferably linoleic acid, conjugated linoleic acid, octadecatrienoic acid (α-linolenic acid), γ-linolenic acid, octadecatetraenoic acid, arachidonic acid, eicosatrienoic acid, eicosapentaenoic acid, and docosahexaenoic acid; and $R^5$ is H, methyl, acrylate group, methacrylate group, or any one selected from $R^4$.

The alkyd resin is a condensation product of a polyol, an anhydride and/or an acrylic acid, a polyunsaturated fatty acid, which means in particular that the alkyd resin is a condensation product of a polyol, an acrylic acid and a polyunsaturated fatty acid, or a condensation product of a polyol, an anhydride and a polyunsaturated fatty acid; or a condensation product of a polyol, an anhydride, acrylic acid and a polyunsaturated fatty acid.

The X group being derived from a dibasic acid or dibasic anhydride means that the X group is a residue of a dibasic acid or dibasic anhydride having a major structural fragment of the dibasic acid or dibasic anhydride. The alkyd resin is a dry alkyd resin that is curable rapidly upon cross-linking in the presence of air (i.e. oxygen containing) and may be a water-soluble alkyd resin or an oil-soluble alkyd resin.

Further, the component which is curable in presence of moisture (i.e. $H_2O$ containing) is an isocyanate, preferably at least one of toluene diisocyanate (TDI), isophorone diisocyanate (IPDI), diphenylmethane diisocyanate (MDI), dicyclohexylmethane diisocyanate (HMDI), hexamethylene diisocyanate (HDI), lysine diisocyanate (LDI), triphenylmethane triisocyanate, trimer of hexamethylene diisocyanate (HDI trimer) and polyphenyl polymethylene polyisocyanate (PAPI). The polyphenyl polymethylene polyisocyanates (PAPI) are preferred.

Further, the electrolyte solution is prepared using the following steps: dissolving the electrolyte in the solvent to prepare a solution of a predetermined concentration, then adding the component which is curable in presence of air and/or moisture to mix well, and finally adding the ionically non-conductive inorganic nanoparticles or nanofibers. Preferably, the electrolyte solution has a thickness of 10 nm-300 μm, more preferably 50 nm-150 μm.

Further, the materials of the first transparent flexible substrate and the second transparent flexible substrate are each independently at least one of polyethylene (PE), polyethylene terephthalate (PET), polyvinyl chloride (PVC), nylon (PA), polyethylene imine (PEI), polyimide (PI), polypropylene (PP), polycarbonate (PC), cyclic olefin polymer (COP), cellulose acetate, polyurethane (PU) and polydimethylsiloxane (PDMS), preferably at least one of polyethylene terephthalate (PET), polycarbonate (PC), polyvinyl chloride (PVC). The first transparent flexible substrate and the second transparent flexible substrate each independently have a thickness of 0.05 nm-1.00 mm, preferably 0.100 nm-0.50 mm.

Further, the materials of the first transparent electron-conductive layer and the second transparent electron-conductive layer are each independently at least one of a metal oxide, a doped metal oxide, a conductive transparent nitride, a metal and an alloy, preferably at least one of an indium tin oxide layer (ITO), a fluorine-doped tin oxide layer (FTO) and a nano-silver wire layer; and the first transparent electron-conductive layer and the second transparent electron-conductive layer each independently has a thickness of 10 nm-1000 nm, preferably 20 nm-200 nm.

Further, the electrochromic layer is at least one of an inorganic electrochromic layer and an organic electrochromic layer. Preferably, the material of the inorganic electrochromic layer is at least one of tungsten oxide ($WO_3$), niobium oxide ($Nb_2O_5$), titanium oxide ($TiO_2$), molybdenum oxide ($MoO_3$), copper oxide (CuO), chromium oxide ($Cr_2O_3$), manganese oxide ($MnO_2$), vanadium oxide ($V_2O_5$), cobalt oxide ($Co_3O_4$), nickel oxide (NiO), prussian blue, a transition metal sulfide and a phthalocyanine compound. Preferably, the material of the organic electrochromic layer is at least one of viologen (quaternary amine salt of 1,1'-disubstituted-4,4'-bipyridyl compound), polyaniline (PANT), Polypyrrole (PPy), polythiophene (PTh) and derivatives thereof. Preferably, the material of the electrochromic layer is at least one of tungsten oxide ($WO_3$), titanium oxide ($TiO_2$), manganese oxide vanadium oxide ($V_2O_5$), prussian blue, viologen (quaternary amine salt of 1,1'-disubstituted-4,4'-bipyridyl compound), polyaniline (PANI), Polypyrrole (PPy), polythiophene (PTh) and derivatives thereof. The electrochromic layer has a thickness of 10 nm-2000 nm, preferably 30 nm-1000 nm.

Further, the ion storage layer uses a complementary material of coloring of the electrochromic layer. For example, if the electrochromic layer is an anodic color-changing material, the ion storage layer can be a cathodic color-changing material, and the ion storage layer can also directly use a material with high light transmittance and capable of providing capacity. The material of the ion storage layer is preferably tungsten oxide ($WO_3$), titanium oxide ($TiO_2$), zinc oxide (ZnO), prussian blue, viologen (quaternary amine salt of 1,1'-disubstituted-4,4'-bipyridyl compound), polyaniline (PANT). The ion storage layer has a thickness of 1 nm-2000 nm, preferably 30 nm-1000 nm.

Further, the electrolyte is an electrolyte composed of at least one cation of $H^+$, $Li^+$, $Na^+$, $K^+$, $Ag^+$, $Ca^{2+}$, $Zn^{2+}$, $Mg^{2+}$, $Ni^{2+}$, $Mn^{2+}$, $Al^{3+}$, and $Fe^{3+}$, and at least one anion of $F^-$, $Cl^-$, $Br^-$, $I^-$, $BF_4^-$, $PF_6^-$, $AsF_6^-$, $SbF_6^-$, $BC_2O_4^-$, $BFC_4O_8^-$, $(CF_3)_2PF_4^-$, $(CF_3)_3PF_3$ $(CF_3)_4PF_2$, $(CF_3)_5PF-$, $(CF_3)_6P^-$, $CF_3SO_3^-$, $C_4F_9SO_3^-$, $CF_3CF_2SO_3^-$, $(CF_3)_2SO_2N^-$, $(CF_3CF_2)_2SO_2N^-$, $F_2SO_2N^-$, $CF_3CF_2(CF_3)_2CO$, $CF_3CO_2$, $CH_3CO_2$, $(CF_3SO_2)_2CH^-$, $CF_3$ $(CF_2)_7SO_3^-$, $ClO_4^-$, $NO_3^-$, $SO_4^{2-}$, $SCN^-$, and $PO_4^3$. The cation of the electrolyte is preferably at least one of $Li^+$, $Na^+$, $K^+$, and $Zn^{2+}$, and $Al^{3+}$ and the anion is preferably at least one of $Cl^-$, $BF_4^-$, $PF_6^-$, $AsF_6^-$, $BC_2O_4^-$, $CF_3SO_3$, $(CF_3)_2SO_2N^-$, $ClO_4^-$, $NO_3$ and $SO_4^{2-}$. The electrolyte is preferably at least one of KCl, $LiClO_4$, HCl, and $H_2SO_4$.

Further, the ionically non-conductive inorganic nanoparticles or nanofibers are one of inorganic oxide nanoparticles, inorganic nitride nanoparticles and ore nanoparticles. The inorganic oxide nanoparticles are at least one of silica, alumina, titania, zirconia, magnesia, yttria, zinc oxide, iron oxide, and ceria. The inorganic nitride nanoparticles are at least one of silicon nitride, titanium nitride, and boron nitride. The ore nanoparticles are at least one of calcium carbonate, calcium sulfate, aluminum hydroxide, potassium titanate, barium titanate, talc, kaolin clay, kaolinite, halloysite, pyrophyllite, montmorillonite, galena, mica, amesite, bentonite, asbestos, zeolite, calcium silicate, magnesium silicate, diatomaceous earth and silica sand.

Further, the solvent is at least one of water and an organic solvent. Preferably, the organic solvent is at least one of an alcoholic solvent, an ethereal solvent, a ketone solvent, an ester solvent, an amide solvent, and a sulfoxide or a sulfone solvent. The alcoholic solvent is preferably at least one of methanol, ethanol, n-propanol, isopropanol, n-butanol, isobutanol, cyclohexanol, benzyl alcohol, ethylene glycol, propylene glycol, and glycerol. The ethereal solvent is preferably at least one of diethyl ether, propyl ether, butyl ether, tetrahydrofuran, pyran, 1,3-dioxolane (DOL), 1,4-dioxane, ethylene glycol monomethyl ether, ethylene glycol monoethyl ether, ethylene glycol methyl ethyl ether, and ethylene glycol diethyl ether. The ketone solvent is preferably at least one of acetone, butanone, methyl isobutyl ketone, cyclohexanone, acetophenone, propiophenone, and acetylacetone. The ester solvent is preferably at least one of ethyl acetate, butyl acetate, phenyl acetate, dimethyl carbonate (DMC), ethyl carbonate (DEC), ethyl methyl carbonate (EMC), ethylene carbonate (EC), propylene carbonate (PC), and vinylene carbonate (VC). The amide solvent is preferably at least one of N,N-dimethylformamide (DMF), N,N-dimethylacetamide (DMAc) and N-methylpyrrolidone (NMP). The sulfoxide or sulfone based solvent is preferably dimethylsulfoxide (DMSO). Further, the solvent is preferably at least one of water, tetrahydrofuran, 1,3-ioxolane (DOL), 1,4-dioxane, ethylene glycol monomethyl ether, ethylene glycol monoethyl ether, ethylene glycol methyl ethyl ether, ethylene glycol diethyl ether, ethyl acetate, butyl acetate, phenyl acetate, dimethyl carbonate (DMC), diethyl carbonate (DEC), ethyl methyl carbonate (EMC), ethylene carbonate (EC), propylene carbonate (PC), vinylene carbonate (VC), and fluoroethylene carbonate (FEC).

In another embodiment, use of the arbitrarily tailorable electrochromic device as described in a display screen of an electronic terminal device, a smart window in an environmental-friendly architectural, an automotive color-changing glass or an automatic anti-glare rear-view mirror is provided.

Since the electrochromic device of the present disclosure can be cut arbitrarily, it is possible to mass-produce a device of uniform size and cut a specific size as needed. For example: the electrochromic device of the present disclosure can be applied to a display screen of an electronic terminal device, the electronic terminal device including but not limited to a mobile phone, a tablet computer and a notebook computer. The electrochromic device of the present disclosure can also be applied to an intelligent green building intelligent window film, and the optical properties of the electrochromic device can be controllably changed under the action of an external low-voltage electric field, and by using this property, light and heat regulation in a specific space can be realized, thereby achieving the purpose of temperature regulation, energy storage and energy saving. The electrochromic device of the present disclosure can also be applied to a color-changing glass of an automobile, and the color-changing glass is applied to a vehicle window of an automobile. In the case of strong sunlight irradiation, the color-changing vehicle window can not only reduce the irradiation intensity of solar rays on a user in the automobile, but also has the effect of protecting the privacy of the user. The electrochromic device of the present disclosure can also be applied to an automatic anti-glare rear-view mirror of an automobile, and can be arbitrarily cut and pasted according to the size and shape of the rearview mirror.

Embodiment 1

An arbitrarily tailorable electrochromic device is prepared by the following method.

The material of both the first transparent flexible substrate and the second transparent flexible substrate is PET with a thickness of 175 m, and the material of both the first transparent electron-conductive layer and the second transparent conductive layer is ITO with a thickness of 100 nm and a sheet resistance of 10Ω/□.

Electroplated prussian blue (PB) is selected as the electrochromic layer, and the preparation thereof is as follows. The whole formed by the first transparent flexible substrate and the first transparent conductive layer (namely, a first PET-ITO substrate (the PET-ITO substrate can be a magnetron sputtered ITO layer on the PET substrate or can also be directly purchased with a fabricated PET-ITO substrate)) is ultrasonically cleaned with acetone, deionized water and ethanol for 5 minutes before use, respectively. A plating solution comprising 0.01 mol/L $K_3[Fe(CN)_6]$, 0.01 mol/L $FeCl_3$ and 0.05 mol/L KCl is prepared and the pH is adjusted to 1.2 with perchloric acid. Using the first PET-ITO substrate as a working electrode, a 1 $cm^2$ platinum sheet as a counter electrode and Ag/AgCl as a reference electrode, a cathode current density of 10 $\mu A/cm^2$ is applied at room temperature and plating is performed for 10 minutes to form PB as an electrochromic layer on the ITO layer of the first PET-ITO substrate.

The ion storage layer is electroplated $WO_3$, and the preparation process thereof is as follows. The whole formed by the second transparent flexible substrate and the second transparent conductive layer (i.e. the second PET-ITO substrate) is ultrasonically cleaned with acetone, deionized water and ethanol, respectively, for 5 minutes before use. Preparation of plating solution: 0.206 g of sodium tungstate/0.13 mL of hydrogen peroxide is added to 50 ml of deionized water, and perchloric acid is added to adjust the pH to 1.2. Using the second PET-ITO substrate as a working electrode, a 1 $cm^2$ platinum sheet as a counter electrode, and Ag/AgCl as a reference electrode, a cathodic current density of −0.7V is applied at room temperature. The plating is performed for 300 s, so as to plate $WO_3$ as an ion storage layer on the ITO layer of the PET-ITO substrate.

A process for preparing an electrolyte solution having a self-encapsulation function is as follows. $LiClO_4$ is dissolved in a mixed solvent of dimethyl carbonate:methyl ethyl carbonate:ethylene carbonate=1:1:1 (volume ratio) under anhydrous and oxygen-free conditions for preparing a solution of 1.5 mol/L, then an oily alkyd resin (in the electrolyte solution, the content of the oily alkyd resin is 50% by mass) is added to the solution and mixed uniformly to prepare an electrolyte solution with a self-encapsulation function, wherein the oily alkyd resin is purchased from Jining Tainuo Chemical Co. Ltd., namely, X in formula (I) is derived from phthalic acid, $R^4$ is derived from α-linolenic acid, and $R^5$ is an acrylate group. The conductivity of the electrolyte solution is measured to be 7.6 $mS \cdot cm^{-1}$ according to DDS-11A, the laboratory of electrical conductivity meter for Shanghai Leici desktop digital display electrical conductivity meter.

Figure 2:
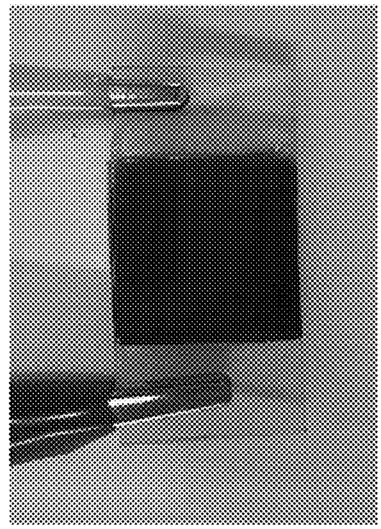
FIG. 2 is a coloring chart of the electrochromic device of Embodiment 1 after cutting.
Figure 3:
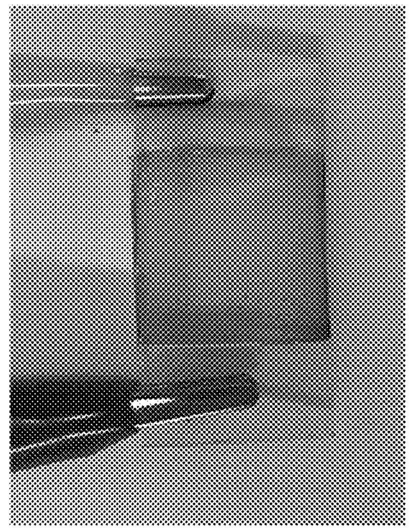
FIG. 3 is a discoloring chart of the electrochromic device of Embodiment 1 after cutting.

The prepared electrolyte solution is scraped onto the ion storage layer, or onto the electrochromic layer, or onto both the ion storage layer and the electrochromic layer, and laminated to form a structure as shown in FIG. 1, comprising in order of a first transparent flexible substrate 1, a first transparent electron-conductive layer 2, an electrochromic layer 3, an electrolyte solution 4 with automatically curable in the presence of air and/or moisture to achieve a self-encapsulation function, an ion storage layer 5, a second transparent electron-conductive layer 6 and a second transparent flexible substrate 7 and being automatically encapsulated after standing for 30 minutes to obtain an electrochromic device. The encapsulated electrochromic device is cutted and one of the devices is tested, as shown in FIGS. 2 and 3, the cutted electrochromic device of this embodiment changed from transparent to dark blue with a maximum light modulation of 76%. The coloring time of the electrochromic device is 7 s, the fading time is 20 s, and multiple cycles can be performed, and the electrochromic device can be bent several times without fading.

Embodiment 2

An arbitrarily tailorable electrochromic device is prepared by the following method.

The material of both the first transparent flexible substrate and the second transparent flexible substrate is PET with a thickness of 175 m, and the material of both the first transparent electron-conductive layer and the second transparent conductive layer is ITO with a thickness of 100 nm and a sheet resistance of 10 Ω/□.

Electroplated PANI (polyaniline) is selected as the electrochromic layer, and the preparation thereof is as follows. The PET-ITO substrate is ultrasonically cleaned with acetone, deionized water, and ethanol, respectively, for 5 minutes before use. A plating solution is prepared, the plating solution comprising 100 mM of aniline and 1 M of $H_2SO_4$. Using the PET-ITO substrate as a working electrode, a 1 $cm^2$ of platinum sheet as a counter electrode, Ag/AgCl as a reference electrode, +2.0 v is applied at room temperature, plating is performed for 45 s, and the film is gently cleaned with high purity water and dried overnight to form PANI as the electrochromic layer on the ITO layer of the PET-ITO substrate.

The material for the ion storage layer is ITO.

The electrolyte solution with a self-encapsulation function is prepared with the following processing: dissolving $LiClO_4$ in water to prepare a 0.4 mol/L solution, then adding an aqueous alkyd resin (in the electrolyte solution, the content of the aqueous alkyd resin is 50% by mass) into the solution, and mixing uniformly to prepare an electrolyte solution with a self-encapsulation function, wherein the aqueous alkyd resin is purchased from Jining Tainuo Chemical Co. Ltd., namely, the X in formula (I) is derived from phthalic acid, $R^5$ is an acrylate group, and $R^4$ is derived from soybean oil acid. The conductivity of the electrolyte solution of this embodiment is measured to be 4.3 $mS \cdot cm^{-1}$ according to DDS-11A, the laboratory of electrical conductivity meter for Shanghai Leici desktop digital display electrical conductivity meter.

A device as shown in FIG. 1 is assembled according to the method in Embodiment 1, and after standing for 15 minutes, encapsulation is automatically completed, followed by cutting, and one of the devices is tested. The electrochromic device cut out in this embodiment can change from dark green to light yellow, the light modulation range is up to 45%, the coloring time of the electrochromic device is 6 s, the fading time is 10 s, and multiple cycles can be performed.

Embodiment 3

An arbitrarily tailorable electrochromic device is prepared by the following method.

The material of both the first transparent flexible substrate and the second transparent flexible substrate is PET with a thickness of 175 m. The material of both the first transparent electron-conductive layer and the second transparent conductive layer is ITO with a thickness of 100 nm and a sheet resistance of 10Ω/□. Magnetron sputtered $WO_3$ is selected as the electrochromic layer, and the preparation thereof is as follows: placing the PET-ITO substrate into a loading chamber of a magnetron sputtering device, bombarding the transparent thin film substrate with ions to eliminate static electricity, vacuumizing after sealing, then transporting the PET-ITO substrate to the sputtering chamber at room temperature, and depositing by means of magnetron sputtering, so as to obtain a $WO_3$ layer as the electrochromic layer. The target used for the magnetron sputtering equipment is a tungsten target. During magnetron sputtering, a direct current/radio frequency power supply is used, the sputtering voltage is 160 V-170 V, the magnetic field strength is 1100 G-1450 G, and the process gas is a mixed gas of argon and oxygen, with the volume ratio of argon: oxygen being 2.5:1.2 in the mixed gas.

The material for the ion storage layer is ITO.

The electrolyte solution with a self-encapsulation function is prepared with the following processing. $LiClO_4$ is dissolved in water to prepare a 0.4 mol/L solution, then an aqueous alkyd resin (in the electrolyte solution, the content of the aqueous alkyd resin is 50% by mass) is added to the solution and mixed uniformly to prepare an electrolyte solution with a self-encapsulation function, wherein the aqueous alkyd resin is purchased from Jining Tainuo Chemical Co. Ltd., namely, X in formula (I) is derived from phthalic acid, $R^5$ is an acrylate group, and $R^4$ is derived from soybean oil acid. The conductivity of the electrolyte solution is measured to be 4.3 $mS \cdot cm^{-1}$ according to DDS-11A, the laboratory of electrical conductivity meter of Shanghai Leici desktop digital display electrical conductivity meter.

A device as shown in FIG. 1 is assembled with the method in Embodiment 1, and after standing for 15 minutes, encapsulation is automatically completed, followed by cutting, and one of the devices is tested. The electrochromic device cut out in this embodiment can change from transparent to dark blue, the light modulation range is up to 65%, the coloring time of the electrochromic device is 4 s, and the fading time is 7 s, and multiple cycles can be performed.

The foregoing is a further detailed description of the present disclosure, taken in conjunction with specific preferred embodiments, and is not to be construed as limiting the particular embodiments of the disclosure. To those skilled in the art to which the disclosure pertains, many equivalents and obvious modifications may be made without departing from the spirit of the disclosure, and the same function or use is to be considered as within the scope of the disclosure.

The invention claimed is:

1. An arbitrarily tailorable electrochromic device, comprising:

in order of a first transparent flexible substrate, a first transparent electron-conductive layer, an electrochromic layer, an electrolyte solution with automatically curable in presence of air and/or moisture to achieve a self-encapsulation function, an ion storage layer, a second transparent electron-conductive layer and a second transparent flexible substrate, wherein the electrolyte solution comprises a component which is curable in presence of air and/or moisture, a solvent and an electrolyte; a content of the component which is curable in presence of air and/or moisture in the electrolyte solution is 20%-70% by mass, and a total content of the electrolyte and the solvent in the electrolyte solution is 30%-80% by mass; and a concentration of the electrolyte in a mixture of both the electrolyte and the solvent is 0.1 mol/L-10.0 mol/L.

2. The arbitrarily tailorable electrochromic device according to claim 1, wherein the electrolyte solution further comprises ionically non-conductive inorganic nanoparticles or nanofibres, a content of the ionically non-conductive inorganic nanoparticles or nanofibres being greater than 0% and less than or equal to 10% by mass relative to a total mass of the component which is curable in presence of air and/or moisture, the solvent and the electrolyte.

3. The arbitrarily tailorable electrochromic device according to claim 1, wherein the concentration of the electrolyte is 0.5 mol/L-5.0 mol/L.

4. The arbitrarily tailorable electrochromic device according to claim 3, wherein the concentration of the electrolyte is 1.0 mol/L-2.5 mol/L.

5. The arbitrarily tailorable electrochromic device according to claim 2, wherein the content of the ionically non-conductive inorganic nanoparticles or nanofibres is 0.5%-5% by mass.

6. The arbitrarily tailorable electrochromic device according to claim 1, wherein the component which is curable in presence of air is an alkyd resin, and/or the component which is curable in presence of moisture is an isocyanate.

7. The arbitrarily tailorable electrochromic device according to claim 6, wherein the alkyd resin is a condensation product of a polyol, an anhydride and/or an acrylic acid, a polyunsaturated fatty acid, having a structure according to formula (I):

Formula (I)

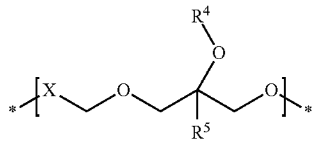

wherein the X group is derived from a diacid or diacid anhydride; $R^4$ is H or derived from a polyunsaturated fatty acid of 6~30 carbons; and $R^5$ is H, methyl, acrylate group, methacrylate group, or any one selected from $R^4$; and/or the isocyanate is at least one of toluene diisocyanate, isophorone diisocyanate, diphenylmethane diisocyanate, dicyclohexylmethane diisocyanate, hexamethylene diisocyanate, lysine diisocyanate, triphenylmethane triisocyanate, trimer of hexamethylene diisocyanate and polyphenyl polymethylene polyisocyanate.

8. The arbitrarily tailorable electrochromic device according to claim 7, wherein the X group is derived from phthalic anhydride, maleic anhydride, terephthalic acid; the $R^4$ is derived from linoleic acid, conjugated linoleic acid, octadecatrienoic acid ($\alpha$-linolenic acid), $\gamma$-linolenic acid, octadecatetraenoic acid, arachidonic acid, eicosatrienoic acid, eicosapentaenoic acid, docosahexaenoic acid; and/or the isocyanate is a polyphenyl polymethylene polyisocyanate.

9. The arbitrarily tailorable electrochromic device according to claim 2, wherein the electrolyte solution is prepared using the following steps: dissolving the electrolyte in the solvent to prepare a solution of a predetermined concentration, then adding the component which is curable in presence of air and/or moisture to mix well, and finally adding the ionically non-conductive inorganic nanoparticles or nanofibers.

10. The arbitrarily tailorable electrochromic device according to claim 1, wherein the electrolyte solution has a thickness of 10 nm-300 μm.

11. The arbitrarily tailorable electrochromic device according to claim 10, wherein the electrolyte solution has a thickness of 50 nm-150 μm.

12. The arbitrarily tailorable electrochromic device according to claim 1, wherein materials of the first transparent flexible substrate and the second transparent flexible substrate are each independently at least one of polyethylene, polyethylene terephthalate, polyvinyl chloride, nylon, polyethylene imine, polyimide, polypropylene, polycarbonate, cyclic olefin polymer, cellulose acetate, polyurethane and polydimethylsiloxane; and the first transparent flexible substrate and the second transparent flexible substrate each independently have a thickness of 0.05 nm-1.00 mm; and/or materials of the first transparent electron-conductive layer and the second transparent electron-conductive layer are each independently at least one of a metal oxide, a doped metal oxide, a conductive transparent nitride, a metal, and an alloy; and the first transparent electron-conductive layer and the second transparent electron-conductive layer each independently have a thickness of 10 nm-1000 nm; and/or the electrochromic layer is at least one of an inorganic electrochromic layer and an organic electrochromic layer, a material of the inorganic electrochromic layer being at least one of tungsten oxide, niobium oxide, titanium oxide, molybdenum oxide, copper oxide, chromium oxide, manganese oxide, vanadium oxide, cobalt oxide, nickel oxide, prussian blue, a transition metal sulfide and a phthalocyanine compound, a material of the organic electrochromic layer being at least one of viologen (a quarternary ammonium salt of 1,1'-disubstituted-4,4'-bipyridyl compound), polyaniline, polypyrrole, polythiophene and derivatives thereof, and the electrochromic layer having a thickness of 10 nm-2000 nm; and/or the ion storage layer uses a complementary material of coloring of the electrochromic layer, and the ion storage layer having a thickness of 1 nm-2000 nm.

13. The arbitrarily tailorable electrochromic device according to claim 12, wherein materials of the first transparent flexible substrate and the second transparent flexible substrate are each independently at least one of polyethylene terephthalate, polycarbonate, polyvinyl chloride; and the first transparent flexible substrate and the second transparent flexible substrate each independently have a thickness of 0.100 nm-0.50 mm; and/or materials of the first transparent electron-conductive layer and the second transparent electron-conductive layer are each independently at least one of an indium tin oxide layer, a fluorine-doped tin oxide layer and a nano-silver wire layer, the first transparent electron-conductive layer and the second transparent electron-conductive layer each independently having a thickness of 20 nm-200 nm; and/or a material of the electrochromic layer is at least one of tungsten oxide, titanium oxide, manganese oxide and vanadium oxide, prussian blue, viologen (a quaternary ammonium salt of a 1,1'-disubstituted-4,4'-bipyridyl compound), polyaniline, polypyrrole, polythiophene and derivatives thereof, the electrochromic layer having a thickness of 30 nm-1000 nm; and/or the ion storage layer is tungsten oxide, titanium oxide, zinc oxide, prussian blue, viologen (a quaternary ammonium salt of 1,1'-disubstituted-4,4'-bipyridyl compound), polyaniline, and the ion storage layer has a thickness of 30 nm-1000 nm.

14. The arbitrarily tailorable electrochromic device according to claim 2, wherein the electrolyte is an electrolyte composed of at least one cation of $H^+$, $Li^+$, $Na^+$, $K^+$, $Ag^+$, $Ca^{2+}$, $Zn^{2+}$, $Mg^{2+}$, $Ni^{2+}$, $Mn^{2+}$, $Al^{3+}$, and $Fe^{3+}$ and at least one anion of F−, $Cl^-$, $Br^-$, $I^-$, $BF_4^-$, $PF_6^-$, $AsF_6^-$, $SbF_6^-$, $BC_2O_4$, $BFC_4O_8$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3)_2SO_2N^-$, $(CF_3CF_2)_2SO_2N^-$, $F_2SO_2N^-$, $CF_3CF_2(CF_3)_2CO^-$, $CF_3CO_2^-$, $CH_3CO_2^-$, $(CF_3SO_2)_2CH^-$, $CF_3(CF_2)_7SO_3^-$, $ClO_4^-$, $NO_3^-$, $SO_4^{2-}$, $SCN^-$, and $PO_4^{3-}$; and/or the ionically non-conductive inorganic nanoparticles or nanofibers are one of inorganic oxide nanoparticles, inorganic nitride nanoparticles and ore nanoparticles; the inorganic oxide nanoparticles are at least one of silica, alumina, titania, zirconia, magnesia, yttria, zinc oxide, iron oxide, and ceria; the inorganic nitride nanoparticles are at least one of silicon nitride, titanium nitride, and boron nitride; the ore nanoparticles are at least one of calcium carbonate, calcium sulfate, aluminum hydroxide, potassium titanate, barium titanate, talc, kaolin clay, kaolinite, halloysite, pyrophyllite, montmorillonite, galena, mica, amesite, bentonite, asbestos, zeolite, calcium silicate, magnesium silicate, diatomaceous earth, and silica sand; and/or the solvent is at least one of water and an organic solvent which is at least one of an alcoholic solvent, an ethereal solvent, a ketone solvent, an ester solvent, an amide solvent, and a sulfoxide or a sulfone solvent.

15. The arbitrarily tailorable electrochromic device according to claim 14, wherein the cation of the electrolyte is at least one of $Li^+$, $Na^+$, $K^+$, $Zn^{2+}$, $Al^{3+}$, and the anion is at least one of $Cl^-$, $BF_4^-$, $PF_6^-$, $AsF_6^-$, $BC_2O_4^-$, $CF_3SO_3^-$, $(CF_3)_2SO_2N^-$, $ClO_4^-$, $NO_3$ $SO_4^{2-}$; and/or the alcoholic solvent is at least one of methanol, ethanol, n-propanol, isopropanol, n-butanol, isobutanol, cyclohexanol, benzyl alcohol, ethylene glycol, propylene glycol, and glycerol; the ethereal solvent is at least one of diethyl ether, propyl ether, butyl ether, tetrahydrofuran, pyran, 1,3-dioxopentacyclic, 1,4-dioxane, ethylene glycol monomethyl ether, ethylene glycol monoethyl ether, ethylene glycol methyl ethyl ether, and ethylene glycol diethyl ether; the ketone solvent is at least one of acetone, butanone, methyl isobutyl ketone, cyclohexanone, acetophenone, propiophenone, and acetylacetone; the ester solvent is at least one of ethyl acetate, butyl acetate, phenyl acetate, dimethyl carbonate, diethyl carbonate, methyl ethyl carbonate, ethylene carbonate, propylene carbonate, and vinylene carbonate; the amide solvent is at least one of $N,N^-$ dimethylformamide, $N,N^-$ dimethylacetamide and $N^-$ methylpyrrolidinone; and the sulfoxide or sulfone solvent is dimethylsulfoxide.

16. The arbitrarily tailorable electrochromic device according to claim 15, wherein the electrolyte is at least one of KCl, $LiClO_4$, HCl, and $H_2SO_4$; and/or the solvent is at least one of water, tetrahydrofuran, 1,3-dioxane, 1,4-dioxane, ethylene glycol monomethyl ether, ethylene glycol monoethyl ether, ethylene glycol methyl ethyl ether, ethylene glycol diethyl ether, ethyl acetate, butyl acetate, phenyl acetate, dimethyl carbonate, diethyl carbonate, methyl ethyl carbonate, ethylene carbonate, propylene carbonate, vinylene carbonate, and fluoroethylene carbonate.

17. Use of the arbitrarily tailorable electrochromic device according to claim 1 in a display screen of an electronic terminal device, a smart window in an environmental-friendly architectural, an automotive color-changing glass or an automatic anti-glare rear-view mirror.

* * * * *